United States Patent [19]
Loraas et al.

[11] Patent Number: 5,957,213
[45] Date of Patent: *Sep. 28, 1999

[54] INTELLIGENT ATTACHMENT TO A POWER TOOL

[75] Inventors: Orlan J. Loraas, Lisbon; Scott B. Jacobson, Kindred; Wally L. Kaczmarski, Lisbon; Kenneth A. Brandt, Wyndmere, all of N. Dak.

[73] Assignee: Clark Equipment Company, Woodcliff Lake, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/815,330

[22] Filed: Mar. 10, 1997

Related U.S. Application Data

[63] Continuation-in-part of application No. 08/655,749, May 30, 1996, Pat. No. 5,713,419.

[51] Int. Cl.$^6$ .................................................. A01B 13/00
[52] U.S. Cl. ............................... 172/2; 37/302; 111/101
[58] Field of Search ............................. 37/301, 302, 303, 37/348, 403, 404, 405, 902, 903; 111/101, 102, 100; 172/2, 4, 4.5, 5, 7; 414/217, 525, 699; 364/424.07

[56] References Cited

U.S. PATENT DOCUMENTS

| | | | |
|---|---|---|---|
| 3,964,182 | 6/1976 | Pomeret et al. | 37/301 |
| 4,095,752 | 6/1978 | Pomeret et al. | 14/151 |
| 4,199,033 | 4/1980 | Van Gundy, Jr. | 173/27 |
| 4,222,186 | 9/1980 | Molby | 37/86 |
| 4,271,879 | 6/1981 | Shivers, Jr. et al. | 37/302 X |
| 4,483,084 | 11/1984 | Caldwell et al. | 37/DIG. 17 X |
| 4,620,362 | 11/1986 | Reynolds | 29/568 |
| 4,846,283 | 7/1989 | Batcheller | 172/10 |
| 4,850,766 | 7/1989 | Furuhashi et al. | 409/234 |
| 4,934,463 | 6/1990 | Ishida et al. | 172/4.5 |
| 4,957,408 | 9/1990 | Ohkura | 414/635 |
| 4,964,779 | 10/1990 | Sagaser | 414/708 |
| 5,065,326 | 11/1991 | Sahm | 354/424.07 |
| 5,188,502 | 2/1993 | Tonsor et al. | 414/700 |
| 5,249,140 | 9/1993 | Kessler | 364/551.01 |
| 5,257,177 | 10/1993 | Bach et al. | 364/167.01 |
| 5,347,448 | 9/1994 | Nam | 364/167.01 |
| 5,353,851 | 10/1994 | Cline | 37/903 X |
| 5,425,431 | 6/1995 | Brandt et al. | 180/273 |
| 5,600,904 | 2/1997 | Bowling | 37/302 |

FOREIGN PATENT DOCUMENTS

| | | |
|---|---|---|
| 0 352 654 | 1/1990 | European Pat. Off. |
| 0 598 937 A1 | 6/1994 | European Pat. Off. |
| 0 810 331 A1 | 12/1997 | European Pat. Off. |

*Primary Examiner*—Robert E. Pezzuto
*Attorney, Agent, or Firm*—Westman, Champlin & Kelly, P.A.

[57] ABSTRACT

A power attachment is attachable to a power machine which has a power circuit. The power machine also includes an operator input device receiving an operator input and providing an output signal indicative of the operator input. The attachment includes a tool and an actuator, coupled to the tool, to drive the tool. The actuator is also connectable to the power circuit of the power machine. A controller is operably coupled to the actuator and is operably couplable to the operator input device. The controller controls operation of the tool based on an operator input signal provided by the operator input device.

48 Claims, 9 Drawing Sheets

INTELLIGENT ATTACHMENT TO A POWER TOOL

REFERENCE TO APPLICATION

The present invention is a continuation-in-part of U.S. patent application Ser. No. 08/655,749, filed May 30, 1996, now U.S. Pat. No. 5,713,419, entitled INTELLIGENT ATTACHMENT TO A POWER TOOL, and assigned to the same assignee as the present application.

BACKGROUND OF THE INVENTION

The present invention deals with a power machine. More specifically, the present invention deals with a power machine having an attachment with a controller thereon for controlling the attachment.

Power machines, such as skid steer loaders, typically have a frame which supports a cab or an operator compartment and a movable lift arm which, in turn, supports a work tool such as a bucket, an auger, a tree spade, or other work tool. The movable lift arm is pivotally coupled to the frame of the skid steer loader and is powered by power actuators which are commonly hydraulic cylinders. In addition, the tool is coupled to the lift arm and is powered by one or more additional power actuators which are also commonly hydraulic cylinders. An operator manipulating a skid steer loader raises and lowers the lift arm, and manipulates the tool, by actuating the hydraulic cylinders coupled to the lift arm, and the hydraulic cylinders coupled to the tool.

With a front attachment (or tool) such as a tree spade, which utilizes a plurality of hydraulic actuators, a number of valves must typically be added to the hydraulic system of the skid steer loader in order to control the flow of hydraulic fluid under pressure to the plurality of cylinders on the tree spade. In the past, the addition of these valves has required the addition of mounting hardware on the skid steer loader. For example, in some prior skid steer loaders, the valve bank used to control the hydraulic actuators on the tree spade was mounted on the doorway of the cab or operator compartment. This required the hydraulic fluid under pressure to be routed to that valve bank, and then out to the tree spade.

It is also common for control levers in skid steer loaders to have hand grips which support a plurality of buttons or actuable switches, actuable by the operator to perform certain functions. Depending on the particular type of attachment or attachments mounted on the skid steer loader, certain functions may be disabled or unusable. Further, depending on the particular type of attachment or attachments mounted on the skid steer loader, certain combinations of inputs from the operator input devices, when performed simultaneously, can result in opposing control valves being opened. This essentially provides an equal amount of pressurized fluid to both sides of a hydraulic actuator or hydraulic motor.

SUMMARY OF THE INVENTION

A power machine includes a power system providing power. The power machine, or an attachment to the power machine, includes an operator input device providing operator input signals based on operator inputs. The attachment also includes a tool, a power actuator removably connected to the power system and connected to the tool, and a controller mounted on the attachment and operably coupled to the operator input device. The controller is configured to control the power actuator based on the operator input signals.

In one preferred embodiment, the attachment is coupled to the power machine and is supported by the power machine so that it is operable when an operator resides in the operator compartment of the power machine. In another preferred embodiment, the attachment comprises a hand held tool which is connected to receive power from the power machine, but which is operable when the operator resides outside of the operator compartment.

DETAILED DESCRIPTION OF THE PREFERRED EMBODIMENTS

Figure 1:
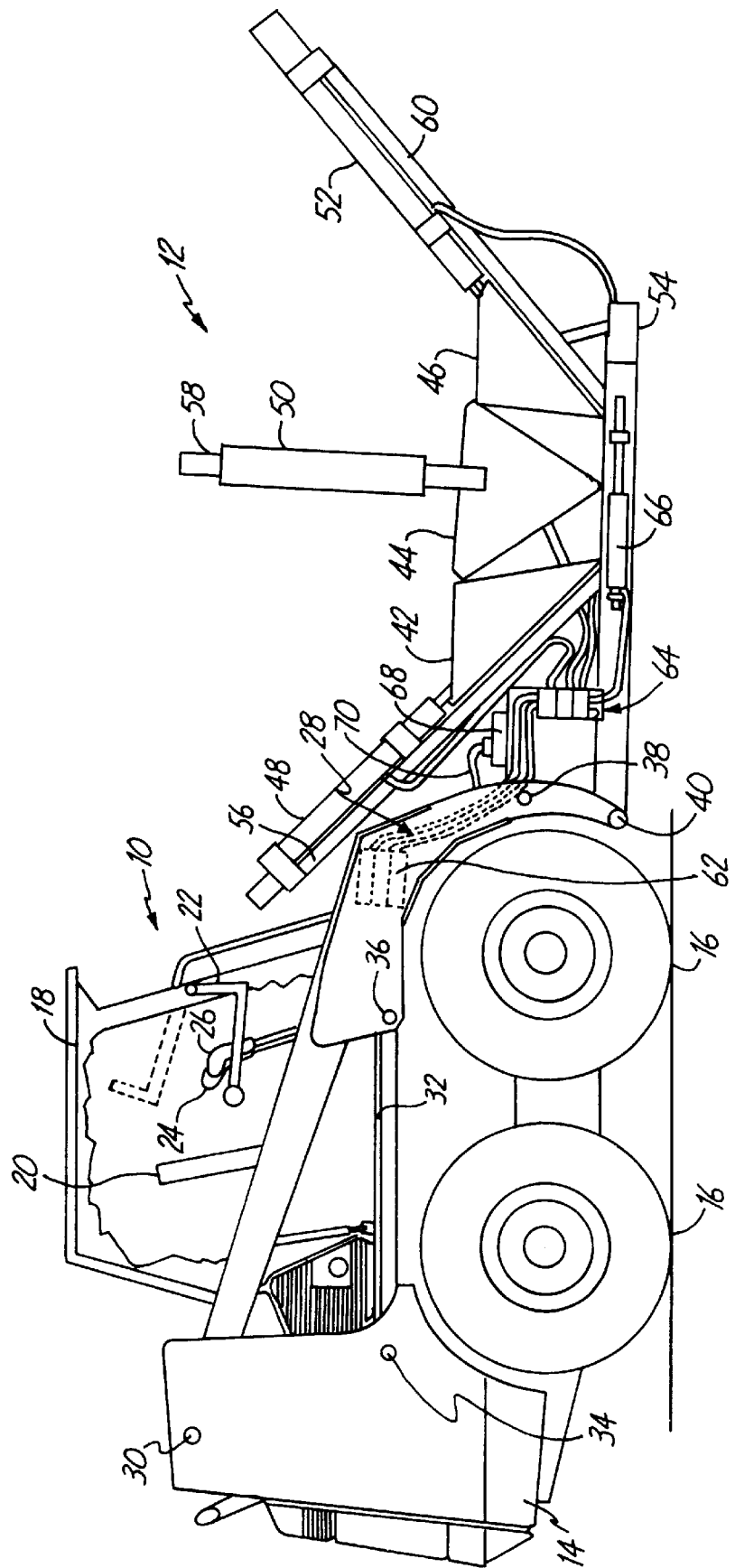
FIG. 1 is a side view of a skid steer loader with a tree spade attachment.

FIG. 1 is a side elevational view of a skid steer loader 10 having an attachment 12 according to the present invention. Skid steer loader 10 includes a frame 14 supported by wheels 16. Frame 14 also supports a cab 18 which defines an operator compartment and which substantially encloses a seat 20 on which an operator sits to control skid steer loader 10. A seat bar 22 is pivotally coupled to a front portion of cab 18. When the operator occupies seat 20, the operator then pivots seat bar 22 from the raised position (shown in phantom in FIG. 1) to a lowered position shown in FIG. 1. Cab 18 also typically includes a pair of control levers 24 and 26 with associated hand grips. Control levers 24 and 26 include actuable inputs (such as rocker switches, buttons or other operator input devices) for providing input signals.

A lift arm 28 is coupled to frame 14 at pivot points 30. A pair of hydraulic cylinders 32 (only one of which is shown in FIG. 1) are pivotally coupled to frame 14 at pivot points 34 and to lift arm 28 at pivot points 36. Lift arm 28 is coupled to tool (or attachment) 12 (which in the embodiment shown in FIG. 1 is a tree spade) at points 38 and 40 or by another suitable connection.

Tree spade 12 includes, in the embodiment shown in FIG. 1, three spades 42, 44 and 46, respectively. It should be noted that any other suitable number of spades can also be used. Spades 42, 44 and 46 are coupled to hydraulic cylinders 48, 50 and 52, respectively. The hydraulic cylinders and spades are connected to a lower bracket 54 by a plurality of support brackets 56, 58 and 60. Spades 42, 44 and 46 are connected to move generally upwardly and downwardly along, and relative to, support brackets 56, 58 and 60.

Hydraulic cylinders 48, 50 and 52 are powered by the hydraulic system of skid steer loader 10 through connection 62. Connection 62 includes a pair of hydraulic fluid line connectors and an electrical harness connector. The hydraulic fluid line connectors in connection 62 are connected, by suitable conduits, to a plurality of electrically controllable valves collectively referred to by numeral 64. Valves 64 have inputs receiving fluid under pressure from the hydraulic system of skid steer loader 10 and have outputs connected to cylinders 48, 50 and 52. In addition, a gate cylinder 66 (which will be described in greater detail with respect to FIG. 2) is coupled to bracket 54 and is also connected to an output of one of the plurality of valves 64.

An electric control circuit 68 is mounted on tree spade 12. Control circuit 68 is described in greater detail later in the specification and includes an electronic controller which receives electrical input signals via an electronic harness 70 (connected to the electrical harness connector in connection 62), from the operator inputs connected to levers 24 and 26. Based on the inputs received, control circuit 68 provides electrical outputs to electrically actuated valves 64 to control the operation of tree spade 12. Upon receiving appropriate input signals, controller 68 controls valves 64 so that the hydraulic cylinders 48, 50 and 52 (which drive spades 42, 44 and 46, respectively) extend or retract, as desired.

Figure 2:
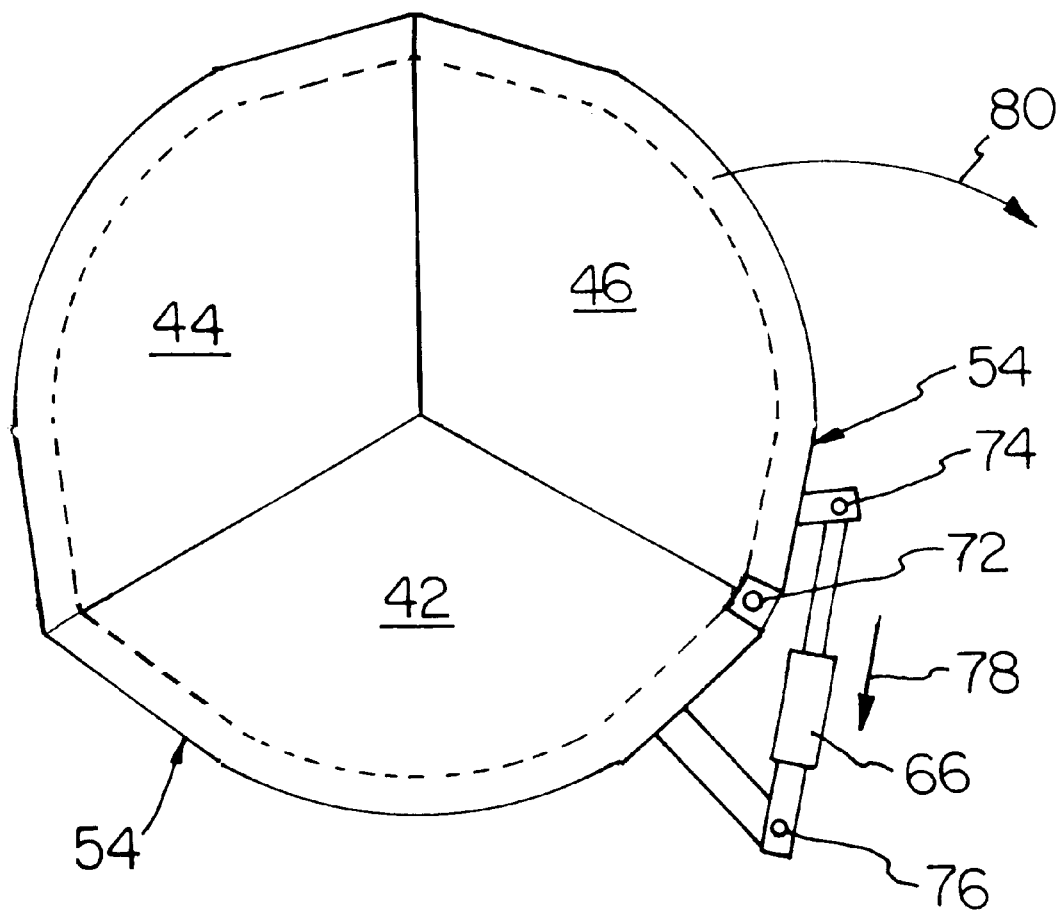
FIG. 2 is a top view of a portion of the tree spade attachment shown in FIG. 1.

FIG. 2 is a top view of a portion of a tree spade 12. When it is desired to remove a plant from the ground, the operator actuates an appropriate input at one of levers 24 and 26 and provides control circuit 68 with a gate signal. This causes control circuit 68 to control one of valves 64 to actuate hydraulic cylinder 66. This causes the portion of bracket 54 which supports spade 46 to pivot relative to the remainder of bracket 54 and to open at a distal end of bracket 54. The operator then drives forward in skid steer loader 10 such that the plant is located substantially in the middle of bracket 54.

The operator then causes control circuit 68 to control one of valves 64 to cause hydraulic cylinder 66 to extend and thereby close the gate. Tree spade 12 is then in position so that spades 42, 44 and 46 can be driven into the ground. Thus, the operator causes control circuit 68 to apply hydraulic fluid under pressure to cylinders 48, 50 and 52 to thereby drive the associated spades 42, 44 and 46 into the ground around the plant. Then, the operator causes hydraulic cylinder 32 to extend and lift bracket 54 and tree spade 12. Skid steer loader 10 can then be driven to the site where the plant contained in tree spade 12 is to be deposited onto the ground, or where it is to be loaded onto another vehicle, etc.

FIG. 2 shows that the portion of bracket 54 which supports spade 46 is pivotally connected to the remainder of bracket 54 at pivot point 72. Also, hydraulic cylinder 66 is pivotally coupled to both portions of bracket 54 at pivot points 74 and 76. Therefore, as hydraulic cylinder 66 is caused to retract such that the piston moves generally in the direction indicated by arrow 78, the portion of bracket 54 supporting spade 46 pivots relative to the remainder of bracket 54 about an arc generally indicated by arrow 80. Thus, the swinging portion of bracket 54 opens like a gate allowing the operator of skid steer loader 10 to drive forward so that the plant to be removed from the ground can be centered among spades 42, 44 and 46. When the plant is in the desired position relative to the spades, the operator causes hydraulic cylinder 66 to again extend and swing the portion of bracket 54, supporting spade 46 back into the closed position so that the spades can be operated.

Figure 3:
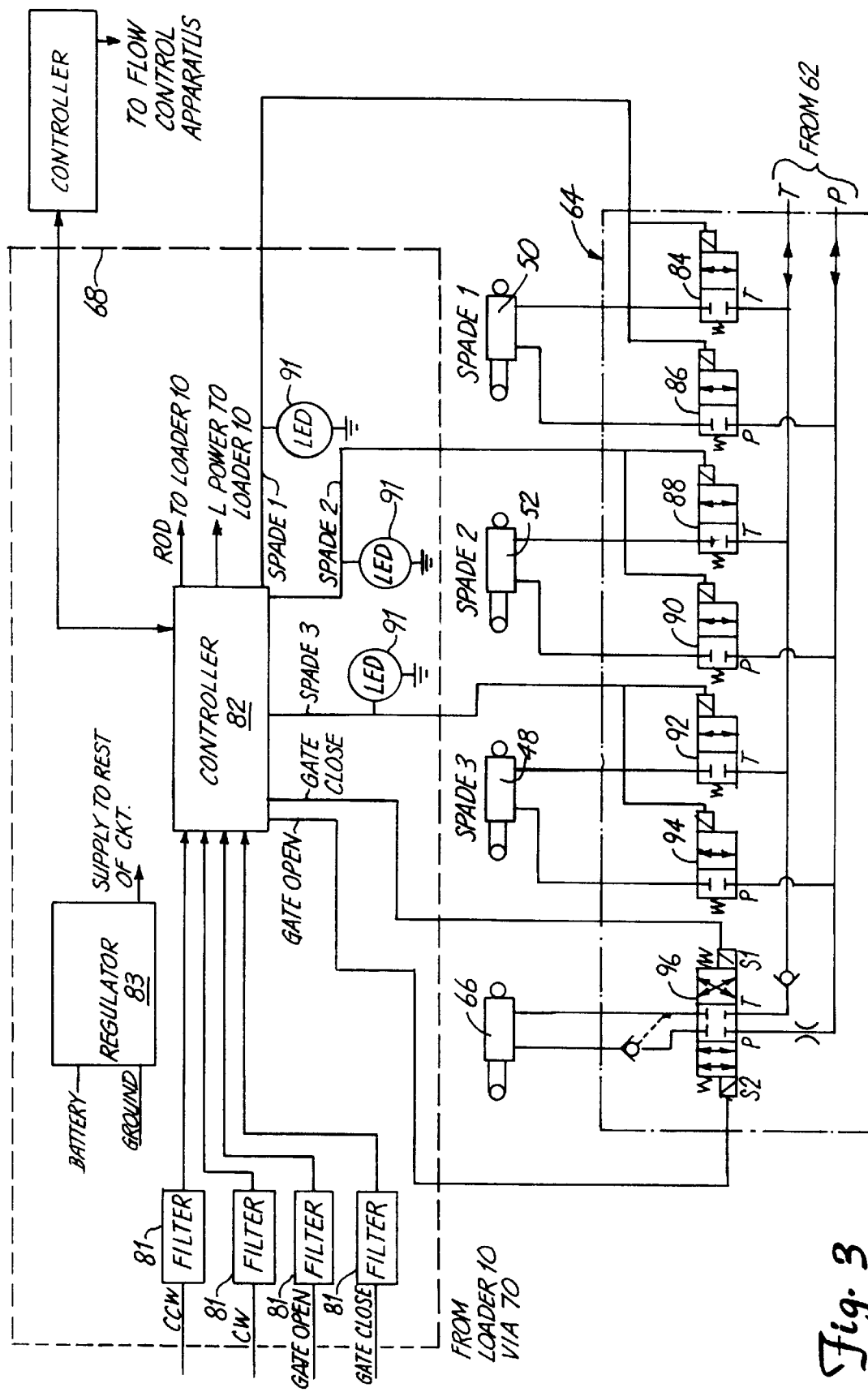
FIG. 3 is a block diagram of a control system controlling the tree spade attachment shown in FIGS. 1 and 2.

FIG. 3 is a block diagram of control circuit 68 according to the present invention. FIG. 3 also shows the connection of control circuit 68 to valves 64 and hydraulic cylinders 48, 50, 52 and 66.

The valves 64 include a pair of solenoid valves associated with each of the spade cylinders 48, 50 and 52, and an additional valve associated with gate cylinder 66. Valves 84 and 86 are associated with cylinder 50, valves 88 and 90 are associated with cylinder 52, valves 92 and 94 are associated with cylinder 48 and valve 96 is associated with cylinder 66. The inputs to the valves can be manipulated to selectively open the hydraulic circuit through the valves to apply hydraulic fluid under pressure to the selected cylinder.

Control circuit 68 also includes a power circuit 83 which receives a battery signal from the battery of skid steer loader 10, as well as a ground signal. Filtering and voltage regulation circuitry is provided so that a controlled and regulated voltage reference potential is obtained in control circuit 68 and used to power the various circuitry therein. The battery signal applied to control circuit 68 is connected to the ignition circuit of skid steer loader 10 so that the battery signal is only applied to control circuit 68 when skid steer loader 10 is running.

Control circuit 68 receives four inputs from the operator input devices on levers 24 and 26. Those inputs include a Counter Clock-wise signal, a Clock-wise signal, a Gate Open signal and a Gate Close signal. Those signals are provided through appropriate filter and conditioning circuitry 81 to controller 82. In the preferred embodiment, controller 82 is a programmable logic controller, a microprocessor, a micro-controller, or other suitable control circuit. Based on the input signals, controller 82 provides seven output signals, SPADE 1, SPADE 2, SPADE 3, GATE OPEN, GATE CLOSE, ROD and L-POWER. The function of controller 82 is described in greater detail below.

In one preferred embodiment, the inputs are provided through rocker switches which are spring loaded to a central position. For example, in the preferred embodiment, both the Clock-wise and Counter Clock-wise input signals are provided by a single rocker switch which is spring loaded to a central position. When the rocker switch is depressed in one direction, the Counter Clock-wise signal is provided to control circuit 68. When the rocker switch is depressed in a second direction, the Clock-wise signal is provided to control circuit 68. This is also the preferred embodiment for providing the Gate Open and Gate Close signals to control circuit 68.

In operation, when control circuit 68 is powered up, one of the spade output signals is energized as a default. In the preferred embodiment, the SPADE 1 output signal is energized. When the SPADE 1 signal is energized, both valves 84 and 86 receive inputs energizing the solenoids therein from moving the valves to work positions. Once one of the valves 64 is energized, movement of the associated hydraulic cylinder is accomplished through an operator input from one of levers 24 and 26, such as by a button or by rotating a handle or hand grip which causes associated movement of a valve spool in the loaders hydraulic system so that hydraulic fluid is applied to either the base or rod end of the associated hydraulic cylinder. The hand control can either move the valve spool through a mechanical linkage, or through electronic means. Also, the hydraulic fluid can either be provided to the tree spade 12 in an on/off mode, or in a proportional mode. One example of providing hydraulic fluid in a proportional mode is set out in the co-pending patent application, Ser. No. 08/435,601, filed May 5, 1995, entitled HYDRAULIC CONTROL SYSTEM PROVIDING PROPORTIONAL MOVEMENT TO AN ATTACHMENT OF A POWER MACHINE, which is hereby incorporated by reference.

In the case where valves 84 and 86 are energized, actuation of the hand grip causes hydraulic fluid under pressure to be applied to one or the other of valves 84 and 86, and the remaining of valves 84 and 86 to be connected to tank. This causes hydraulic cylinder 50 to either extend or retract (depending on whether the hydraulic fluid under pressure is provided to the base end or the rod end of cylinder 50). Therefore, cylinder 50 either drives spade 44 into the ground or removes spade 44 from the ground.

If the operator then desires to manipulate another one of spades 42, 44 or 46, the operator simply either applies the Counter Clock-wise signal or the Clock-wise signal to controller 82. If the operator applies the Counter Clock-wise signal, controller 82 activates the SPADE 2 output which energizes both of valves 88 and 90. Then, by depressing the appropriate button on one of levers 24 or 26, hydraulic fluid under pressure is applied through one valves of 88 and 90 to either the base or rod end of hydraulic actuator 52 to cause it to either extend or retract. This causes spade 46 to either be driven into the ground or withdrawn from the ground.

It can be seen that by manipulating the Clock-wise and Counter Clock-wise signals provided to controller 82, the operator can substantially choose any desired spade for manipulation. In addition, it should be noted that indicia can optionally be provided to the operator indicating which of the spade solenoids are then energized. Such indicia can include a light emitting (LED) 91 which is coupled to the output of controller 82 and positioned so that it can be seen by the operator.

The Gate Open and Gate Close hydraulic cylinder 66 is operated in a similar manner. If the operator depresses the appropriate rocker switch indicating that the operator desires the gate to be opened, the Gate Open signal is applied to controller 82 and controller 82 energizes the GATE OPEN output. This output is provided to valve 96 energizing a solenoid to cause the spool to move from the neutral position to a work position in which hydraulic fluid under pressure is applied to the rod end of hydraulic cylinder 66. This causes hydraulic cylinder 66 to retract and thereby pivot spade 46 to open the gate of tree spade 12 (as discussed with respect to FIG. 2). When the operator desires to close the gate, the operator applies the Gate Close signal to controller 82. Controller 82, in turn, provides the GATE CLOSE output to valve 96 causing the solenoid to be energized to move the spool in the opposite direction so that hydraulic fluid under pressure is provided to the base end of hydraulic cylinder 66. This causes hydraulic cylinder 66 to extend and thereby close the gate of tree spade 12 (as also discussed with respect to FIG. 2).

In some skid steer loaders 10, a diverter valve is provided in the hydraulic power circuit which diverts hydraulic fluid flow either to the front auxiliary connections, or to the rear auxiliary connections. In one preferred embodiment, skid steer loader 10 may be provided with rear stabilizers which are powered through the rear auxiliary connections. Therefore, the L-power output is provided by controller 82. This output is provided back to the hydraulic power circuit of skid steer loader 10 and is applied to the diverter valve (through energization of appropriate relays) which diverts fluid flow between the front and rear auxiliaries. In this way, certain of the functions on the tree spade 12 (such as the Gate Open and the Gate Close functions) can be powered with hydraulic fluid which would otherwise be diverted to the rear auxiliary connections.

In other words, when the Gate Open or Gate Close input is activated, the L-power output causes the diverter valve to divert flow to the front auxiliary connections to provide hydraulic fluid under pressure to hydraulic cylinder 66. However, when neither the Gate Open nor Gate Close input is energized, controller 82 provides the L-power output in the de-energized state so that the diverter valve on the skid steer loader 10 diverts fluid to the rear auxiliary connections so that the rear stabilizers can be manipulated by the operator.

The ROD output from controller 82 is provided for a similar reason. The same operator input device on one of levers 24 or 26 which is used to cycle the energized spade output, either Clock-wise or Counter Clock-wise, can also be used to manipulate the rear stabilizers. Therefore, the output signal is provided so that hydraulic fluid under pressure is provided to both sides of a directional control valve that controls the rear auxiliaries so that movement does not occur in the stabilizers when the operator only wishes to cycle the energized spade output.

It should also be noted that controller 82 can be coupled for communication with a controller, such as 83, which resides on the skid steer loader 10. In one preferred embodiment, controller 83 is an on/off controller which controls hydraulic fluid flow to the attachment. In another embodiment, controller 83 is a proportional controller such as that described in U.S. application Ser. No. 08/435,601 incorporated herein by reference. Briefly, the proportional controller controls flow of hydraulic fluid to the attachment in a pulse-width-modulated, or other proportional manner.

Figure 4:
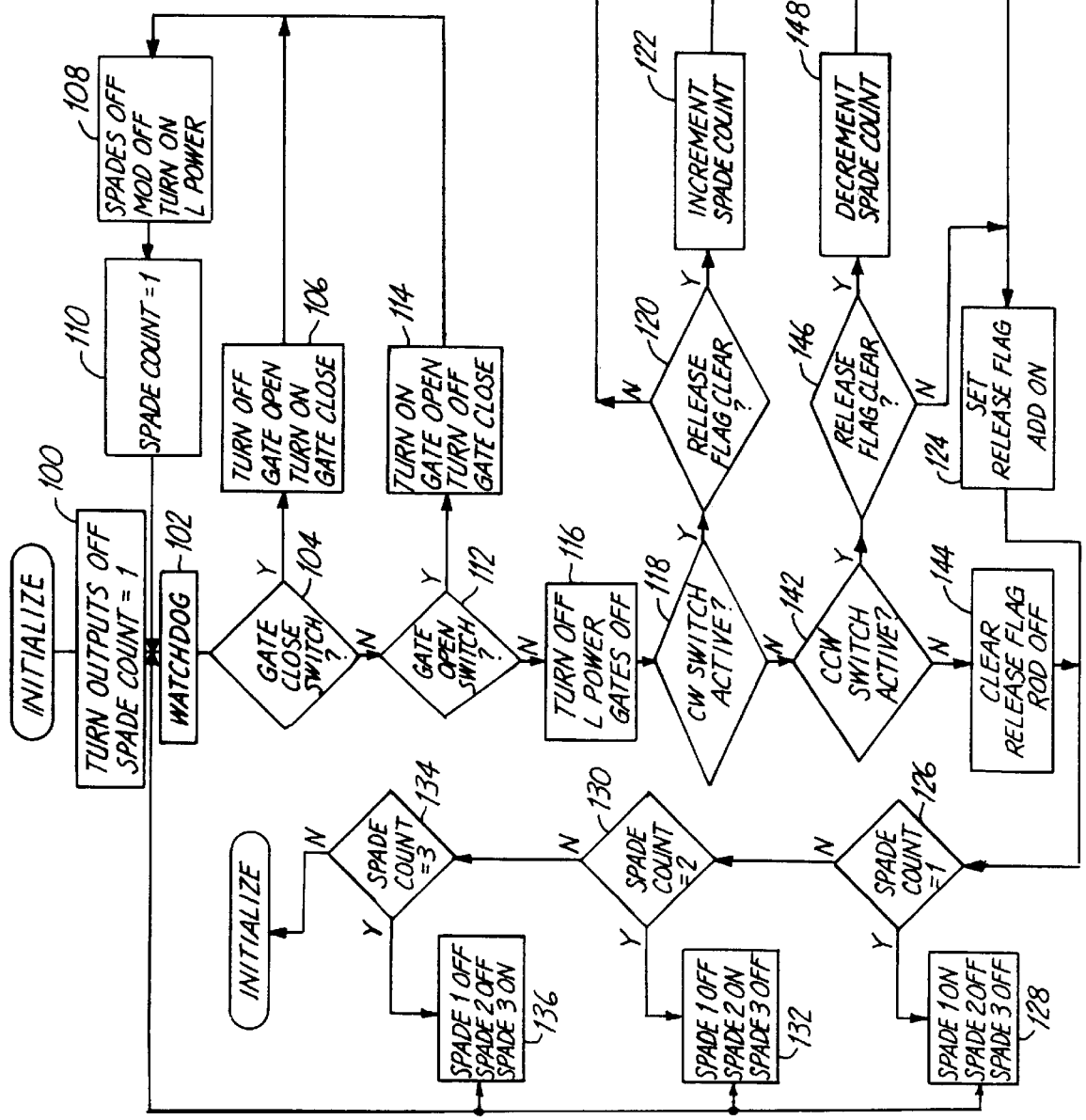
FIG. 4 is a flow chart illustrating operation of the tree spade attachment shown in FIGS. 1 and 2.

FIG. 4 is a flow diagram of the operation of control circuit 68 according to the present invention. Initially, when control circuit 68 is powered up, all of the outputs are turned off and a variable referred to as Spade Count is set to 1. This is indicated by block 100. A watch dog timer set with any suitable recycle time is implemented. Controller 82 waits for the time out period for the watch dog timer to lapse. This is indicated by block 102.

When operation commences, controller 82 determines whether the Gate Close signal has been applied. This is indicated by block 104. If so, controller 82 turns off the GATE OPEN output (if it was on) and turns on or energizes, the GATE CLOSE output. This is indicated by block 106. Then, controller 82 assures that all of the SPADE output signals are turned off, that the ROD output signal is turned off, and that the L-POWER output is turned on. This is indicated by block 108. The spade count variable is set to 1 (if it is not already 1) and control returns to block 102. This is indicated by block 110.

If, at block 104, the Gate Close input signal has not been applied, controller 82 determines whether the Gate Open signal has been applied. This is indicated by block 112. If so, controller 82 turns on the GATE OPEN output and turns off the GATE CLOSE output. This is indicated by block 114. Then, processing continues through blocks 108 and 110.

If, at block 112, controller 82 determines that the Gate Open signal has not been applied, controller 82 turns off the L-POWER output, as well as the GATE OPEN and GATE CLOSE outputs. This is indicated by block 116.

Controller 82 then determines whether the Clock-wise switch has been activated. This is indicated by block 118. If so, a variable referred to as release flag is examined by controller 82. If the release flag variable is clear, the spade count is incremented. This is indicated by blocks 120 and 122. However, if the release flag is not clear, the release flag is set, the ROD output is turned on, and the controller 82 energizes the appropriate spade output signal based or the spade count. This is indicated by blocks 124, 126, 128, 130, 132, 134 and 136.

If, after the spade count has been incremented, the count is less than or equal to three, then it is a valid count and proceeds according to blocks 124, 126, 128, 130, 132, 134 and 136. However, if at block 122, the spade count has been incremented so that is greater than 3, then the count is set to 1 and processing continues with respect to blocks 124, 126, 128, 130, 132, 134 and 136. This sequence is indicated by blocks 138 and 140.

If, at block 118, controller 82 determines that the Clockwise input is not active, controller 82 determines whether the Counter Clock-wise input is active. This is indicated at block 142. If not, the variable release flag is cleared, the ROD output is turned off, and processing continues with respect to blocks 126, 128, 130, 132, 134 and 136. This is indicated by block 144.

However, if the Counter Clock-wise input is activated in block 142, then controller 82 proceeds substantially in the same fashion as indicated with respect to blocks 120, 122, 138 and 140. The difference is that if the release flag is clear, the spade count is decremented. Also, if, after being decremented, the spade count is less than 1, then the spade count is set to 3. This is indicated by blocks 146, 148, 150 and 152.

Figure 5:
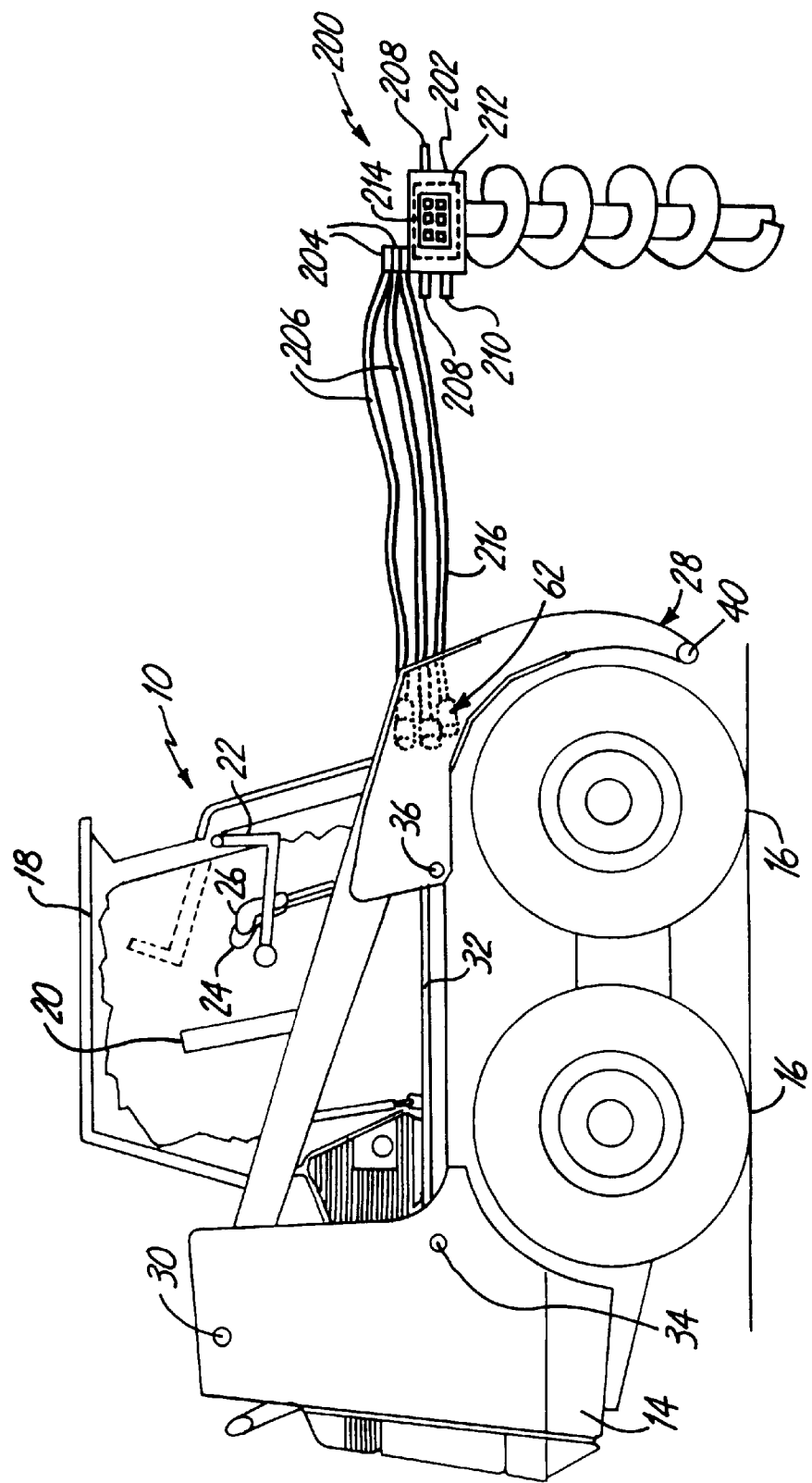
FIG. 5 is a side view of a skid steer loader with a hand-operated auger attachment.

It should also be noted that the present invention is suitable for use with hand held tools as well. For instance, FIG. 5 illustrates a hand operated (or hand held) auger 200 coupled to skid steer loader 10. Auger 200 includes a hydraulic motor 202 which is coupled to a pair of hydraulic fluid connectors 204 which are, in turn, coupled to a pair of hydraulic hoses 206. Hoses 206 are, in turn, coupled to connector 62. Auger 200 also includes handles 208 and an operator actuable hand grip or switch 210.

In one preferred embodiment, a control circuit 212, shown in phantom in FIG. 5, is housed in the same housing which houses motor 202. Control circuit 212 includes an operator input device 214 which, in the preferred embodiment, is a keypad input device which includes a display. Control circuit 212 receives electrical power, in one embodiment, from the electrical system on skid steer loader 10. Electrical power is provided to control circuit 212 by an electrical harness 216. In addition, control signals are also preferably communicated through electrical harness 216 between control circuit 212, and the electronic control circuit on skid steer loader 10.

In operation, an operator who desires to operate auger 200 first preferably keys in a predetermined code through operator interface keypad 214. The controller in control circuit 212 then provides communication signals over electric harness 216 to the control circuit in skid steer loader 10. The controller in control circuit 212 preferably first provides identification signals through electrical harness 216 to the control circuit in skid steer loader 10. The identification signals can be provided either in response to the operator keying in a code on the keypad 214 or automatically as soon as the attachment is coupled to the power machine and power is provided. The control circuit in skid steer loader 10 then configures the hydraulic system in skid steer loader 10 to provide hydraulic fluid at an appropriate flow rate, and at an appropriate pressure through hoses 206. In other words, hand held auger 200 may well not require, and not operate efficiently under, the pressures and flow rates required to operate, for example, tree spade 12. Therefore, in the embodiment in which the hydraulic system on skid steer loader 10 includes a proportional flow controller, the flow is controlled appropriately. Also, the hydraulic system on skid steer loader 10 (as will be described with respect to FIG. 6) may include flow restrictors or other types of flow controllers which are controlled based upon the particular attachment identified.

Alternatively, auger 200 can be provided with pressure reduction valves connected to hydraulic couplers 204. Such reduction valves would be coupled to, and controllable by, control circuit 212 such that hydraulic fluid is provided at the appropriate pressure and flow rate.

It should also be noted that, under certain operating conditions with certain attachments, either control circuit 212, or the electronic control system on skid steer loader 10, is preferably configured to modify the functionality of skid steer loader 10. In other words, when an operator is operating hand held auger 200, control circuit 212 preferably communicates electrical signals through harness 216 to the control system on skid steer loader 10. In response, the control system on skid steer loader 10 may engage a traction lock mechanism which locks the wheels 16 of skid steer loader 10 so that skid steer loader 10 cannot be moved during operation of auger 200. Further, the control system on skid steer loader 10 may also cause limited functionality of the hydraulic system on skid steer loader 10 such that the operation of cylinders 32, the operation of auxiliary couplings, and the operation of other hydraulic systems associated with skid steer loader 10, are locked out or otherwise suitably modified.

Once hydraulic fluid is available through hoses 206, at the desired pressure and flow rate, auger 200 is operable. The operator then preferably grasps handles 208 and actuates switch 210 in order to operate auger 200. Switch 210 is preferably biased in an off position and is actuated by the operator squeezing switch 210 toward handle 208. Thus, when the operator releases switch 210, it automatically returns to the off position. Operator interface 214 also preferably includes a direction switch so that auger 200 can be operated in either direction.

When the operator is no longer operating auger 200 and has released switch 210, the operator preferably actuates a stop or pause button or other suitable operator input switch. In response, the hydraulic system on skid steer loader 10 is preferably configured so that hydraulic fluid under pressure is no longer provided through hoses 206. This essentially prevents hoses 206 from being pressurized when auger 200 is not is use. Depressurizing hoses 206 can also be accomplished simply in response to the operator releasing switch 210, and repressurization then occurs in response to the operator re-grasping switch 210.

Further, under certain circumstances, the operator may wish to preclude operation of the attachment by others. In that instance, the operator preferably keys in an appropriate lock out code into keypad 214. In response, control circuit 212 precludes operation of the attachment until another appropriate code is keyed in. It should also be noted that, in one preferred embodiment, the control circuit 212 precludes operation each time switch 210 is released or each time a stop button is pushed, and the operator must re-enter the appropriate code in order to re-start the attachment. Alternatively, control circuit 212 can set a timer whenever the operator keys in the code, and control circuit 212 maintains the attachment in a functional state for the entire interval set by the timer. Such a system is described in greater detail in co-pending U.S. patent application Ser. No. 08/796,882 entitled KEYLESS IGNITION SYSTEM WITH DELAYED SECURITY filed on Feb. 7, 1997 assigned to the same assignee as the present application and hereby fully incorporated by reference.

Figure 6:
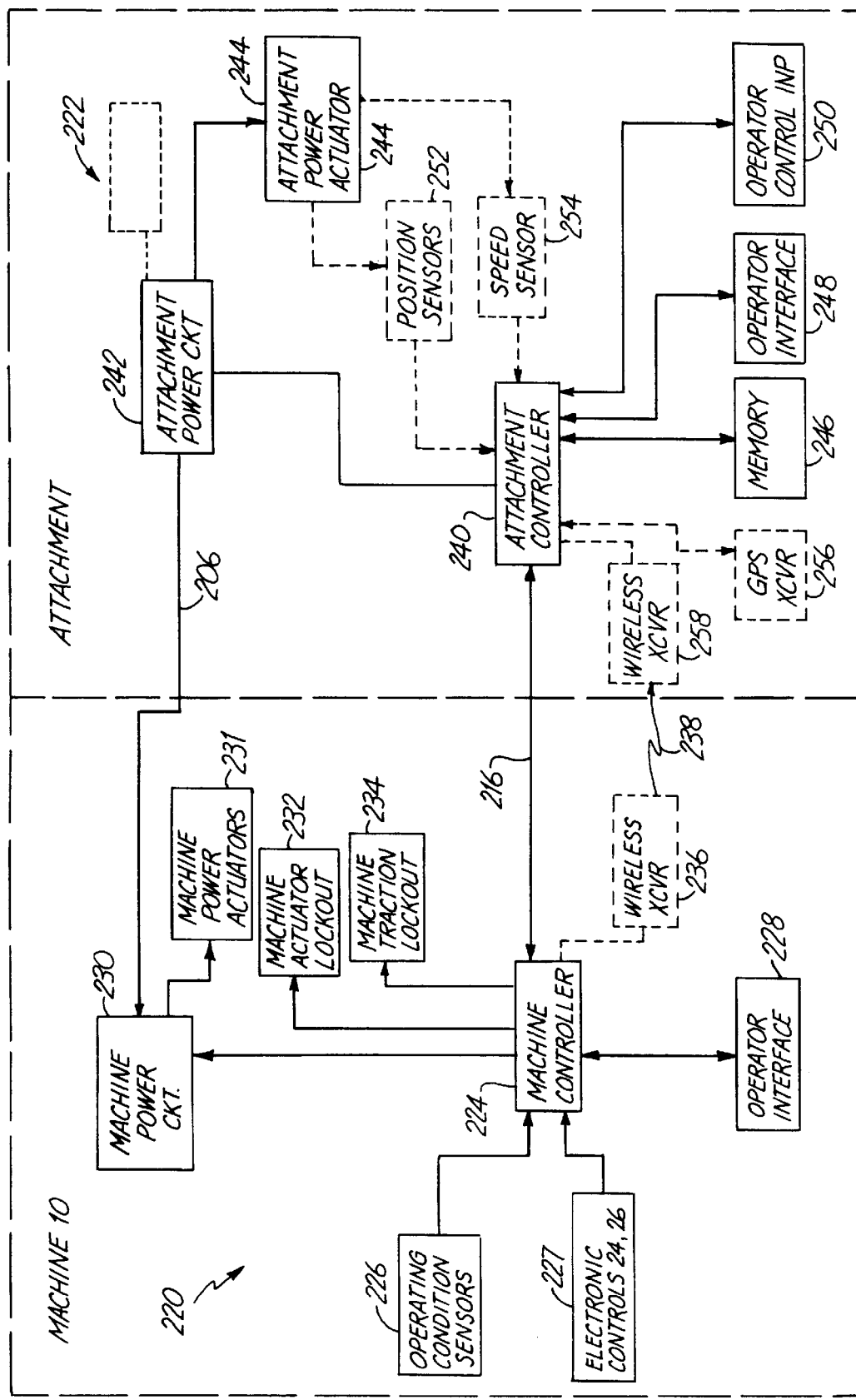
FIG. 6 is a block diagram of one embodiment of a control circuit of a skid steer loader and attachment in accordance with the present invention.

FIG. 6 is a block diagram of one embodiment of a control system 220 for power machine 10 and a control system 222 for an attachment, such as hand held auger 200, or other attachments such as those described herein. Control system 220 includes machine controller 224, operating condition sensors 226, electronic controls 227 (which may be implemented as, for example, hand grips 24 and 26) operator interface 228, hydraulic power system 230, machine power actuators 231 (which may be implemented as, for example, cylinders 32), machine actuator lockout system 232 and machine traction lockout system 234. Control system 220 may also optionally include wireless transceiver 236.

Machine controller 224 preferably includes a digital computer or other suitable microcontroller. Operating condition sensors 226 include sensors for sensing desired operating conditions. Such sensors can include sensors which provide signals indicative of the position of seat bar 22, and sensors which provide signals indicative of the presence of an operator in seat 20. Such sensors are described in greater detail in U.S. Pat. No. 5,425,431, and U.S. patent application Ser. No. 08/199,120, both of which are incorporated above by reference. Briefly, such sensors preferably include Hall effect, infra-red, or other suitable sensors which provide an output signal to machine controller 224 which is indicative of the sensed parameter. Based on those signals, machine controller 224 controls functionality of skid steer loader 10, and the attachment associated therewith.

Electronic controls 227 provide signals indicative of operator inputs. Such electronic controls can include, for example, hand grips 24 and 26, switches or buttons or other operator input devices associated with the hand grips 24 and 26, operator inputs from foot pedals within cab 18, inputs from membrane or keypad inputs provided in cab 18, or any other suitable operator input device.

Operator interface 228 preferably provides a visual or audible indication to the operator which indicates the desired operating conditions or operator characteristics of machine 10 or the associated attachment. Operator interface 228 may, for example, include an LCD display, a CRT-type display terminal, a series of LEDs, audible indicators, or other suitable operator interface devices.

Machine power circuit 230, in the preferred embodiment, includes the hydraulic and electrical power systems for machine 10. Such a system can be implemented in any suitable way, including those set out in the patents and patent applications incorporated herein by reference. Further features of machine power circuit 230 are described later in the specification. The machine power actuators 231 for machine 10 include hydraulic cylinders 32 and also include any other controllable actuators on machine 10, such as the traction motors used for driving wheels 16, and any other power actuators associated with machine 10.

Machine actuator lockout system 232 and machine traction lockout system 234 are both used in modifying the functionality of machine 10. In the preferred embodiment, machine actuator lockout system 232 is used to lockout or modify the operation of certain of the machine power actuators 231 associated with machine 10. Similarly, machine traction lockout system 234 preferably locks out or modifies the operation of the traction motors used to drive wheels 16 (or other traction devices such as tracks used on a mini-excavator). The lockout systems are used under certain conditions which may be sensed by operating condition sensors 226, which may be input by the operator through electronic controls 227, or which may be communicated to machine controller 224 by attachment control circuit 222. One more detailed embodiment of the machine actuator lockout system 232 and the machine traction lockout system 234 is described in the U.S. Pat. No. 5,425,431 entitled INTERLOCK CONTROL SYSTEM FOR POWER MACHINE, which is incorporated by reference herein.

Wireless transceiver 236 is optionally provided on machine 10. In the preferred embodiment, wireless transceiver 236 is an infra-red frequency, cellular, or other suitable wireless communication transceiver. Communication with the attachment associated with machine 10 can then be established using a wireless link 238, rather than, or in addition to, harness 216.

Control system 222, in one preferred embodiment, includes attachment controller 240, attachment power circuit 242, attachment power actuator 244, memory 246, operator interface 248 and operator control inputs 250. Also, control system 222 may optionally include, in order to implement certain features, position sensors 252, actuator speed sensor 254, GPS transceiver 256 and wireless transceiver 258.

In the preferred embodiment, attachment controller 240, as with machine controller 244, is a digital computer or other suitable controller which is coupled by harness 216 (or wireless link 238) to communicate with machine controller 224 using a serial communications protocol. Attachment controller 240 is coupled to attachment power circuit 242. In the preferred embodiment, attachment power circuit 242 includes the hydraulic system or electrical system, or both, associated with the particular attachment corresponding to control system 222. In one preferred embodiment, attachment power circuit 242 includes a hydraulic routing circuit which receives hydraulic fluid under pressure from machine power circuit 230 through hoses 206. Attachment power circuit 242 provides suitable outputs to power attachment power actuator 244.

Attachment power actuator 244, in the preferred embodiment, is a power actuator associated with the attachment. In one embodiment, for instance, attachment power actuator 244 corresponds to hydraulic motor 202 used to power hand held auger 200 shown in FIG. 5.

Memory 246 is preferably associated with attachment controller 240 and stores suitable programs therein. Memory 246 may also be used, as will be described later in greater detail, in order to implement other features associated with the present invention.

Operator interface 248, as with operator interface 228, preferably includes visual or audible indicia provided to inform the operator of the attachment of any desired operating conditions or operating parameters. Also, operator control inputs 250, as with the electronic controls corresponding to machine 10, typically include operator actuable switches, a keypad or membrane input devices, operator actuable hand grips, or other suitable operator input devices which can be used to provide control signals indicative of operator inputs to attachment controller 240.

Wireless transceiver 258, as with wireless transceiver 236, is preferably any suitable type of wireless transceiver which can be used to facilitate communication between attachment controller 240 and machine controller 244.

During normal operation of the attachment, attachment controller 240, upon being connected to machine controller 224 communicates to machine controller 224 the precise type of attachment being attached to machine 10. Further, while attachment controller 240 may indicate to machine controller 224 the precise attachment then being coupled to machine 10, this can also be obtained by machine controller 224 looking for a specific pin configuration to which harness 216 is attached on the attachment. Attachment controller 240 may also communicate the power and other requirements associated with the attachment. Alternatively, machine controller 224 may reference a look-up table based upon the type of attachment then being attached to machine 10 in order to determine the power and other operating requirements for the particular attachment. Based upon the information obtained, machine controller 224 controls control system 220 accordingly.

For instance, where the attachment associated with machine 10 is a hand held device, such as auger 200 shown in FIG. 5, the hydraulic fluid pressure and flow rate from machine 10 may need to be adjusted. In one instance, either machine controller 224 controls machine power circuit 230 to provide the hydraulic fluid at a desirable pressure and at a desirable flow rate through hoses 206 to attachment power circuit 242, or attachment controller 240 controls attachment power circuit 242 to adjust the flow rate and pressure of the hydraulic fluid received from machine power circuit 230 to bring it within a suitable range.

Further, where the attachment is a hand held tool, it may be desirable to control machine actuator lockout system 232 and machine traction lock system 234 to modify the functionality of machine 10. For instance, it may be desirable to cause machine actuator lockout system 232 to lockout operation of hydraulic cylinders 32 and other power actuators on machine 10 when the hand held tool (such as auger 200) is coupled to the machine. Further, it may be desirable for machine traction lockout system 234 to engage traction mechanisms which will inhibit movement of wheels 16 of machine 10. In that instance, upon receiving identification information from attachment controller 240, machine controller 224 controls systems 232 and 234 to modify the functionality of machine 10 appropriately. Alternatively, of course, attachment controller 240 can be coupled directly through harness 216 to systems 232 and 234. In that case, attachment controller 240 directly controls those systems itself, rather than through machine controller 224.

It should also be noted that, under certain circumstances, it may be undesirable for some attachments to be used with some models or types of machines. In this instance, either attachment controller 240 or machine controller 224 locks out operation of the attachment (also, possibly, machine 10) until the inappropriate attachment is decoupled from the machine.

Once machine 10 is configured to facilitate operation of the attachment, the operator actuates the operator control input device 242 (such as a power switch or hand grip) to instigate operation of the attachment. For instance, where the attachment is hand held auger 200, operator control inputs 250 correspond to handles 208 and actuable hand grip 210. When the operator control input 250 is actuated, attachment controller 240 calls for power to be supplied to the attachment power actuator 244. This causes machine controller 224 to provide hydraulic fluid, for instance, through machine power circuit 230 to attachment power circuit 242, where the hydraulic fluid under pressure is provided to attachment power actuator 244.

Where the load being called for by the attachment is particularly heavy, machine controller 224 can take additional steps. For instance, machine power circuit 230 also preferably includes the engine powering the hydraulic fluid pumps in the hydraulic power circuit on machine 10. Where the load being called for by the attachment is heavy, machine controller 224 preferably increases the RPM output of the engine powering the pumps and thereby increases the ability of the pumps to provide hydraulic fluid under pressure. Of course, where the load is not heavy, machine controller 224 controls the engine to reduce its RPM output. Thus, by determining the type of attachment which is then attached to machine 10, and by determining the specific load requested, attachment controller 240 and machine controller 224 combine to promote efficiency of the overall system.

Further, in the preferred embodiment, the degree to which the operator actuates the operator control input 250 (such as hand grip 210) indicates the degree to which flow is requested. When the operator control input 250 is not actuated, the attachment preferably idles or stops. When the attachment is idling or has stopped, machine controller 224 receives information from attachment controller 240 indicative of this and causes the engine on machine 10 to slow down. This also increases the efficiency of the overall system. This not only conserves fuel, but efficiently manages horsepower of the system. It also keeps noise to a minimum because the engine on machine 10 will only be at a high speed when that is required. This also efficiently manages heat generation in the attachment and in machine 10. If the attachment and machine 10 are heavily loaded, they both generate heat. This reduces the lifetime of both the attachment and the machine. By managing the load so that it is only provided and generated when needed or requested by the operator of the attachment, the heat generated by machine 10 and the attachment are reduced and the lifetime of the machine and attachment can be increased.

It should also be noted that flow and fluid pressure to the attachment can be controlled in a number of ways. For example, the flow of hydraulic fluid can be controlled by varying the engine speed which drives a fixed displacement pump in the hydraulic system associated with machine 10. In addition, variable displacement pumps can be provided and can be controlled by either machine controller 224 or attachment controller 240. In the preferred embodiment, a given range of flows is provided for any specific attachment. The controllers 224 and 240 vary the flow within that range, or keep the flow steady within that range, depending on the application. The engine speed of the engine driving the pump is controlled by providing an engine speed sensor (which can be any known engine speed sensor) and coupling the engine speed sensor to machine controller 224. Machine controller 224 acts to speed up the engine (by manipulating a throttle) or slow down the engine in order to keep the engine speed within the desired range.

When the operator has finished operating the attachment, the operator first releases the operator control input (such as hand grip 210) to stop actuation of the attachment power actuator 244. Then, the operator preferably actuates another operator control input device 250 (such as a switch or membrane keypad input) which indicates that the operator no longer wishes to operate the attachment. This is preferably communicated to machine controller 224 by attachment controller 240. In that instance, machine controller 224 then preferably controls machine power circuit 230 so that power is no longer supplied through hoses 206. This removes the high pressure from hoses 206 when the attachment is not in use.

In yet another preferred embodiment, operator control inputs 250 include a machine start input, such as a key, a sequence of membrane keypad inputs, or other suitable switches. Thus, in the instance where the operator is not located in the cab 18 during operation of the attachment (such as when the attachment is a hand held attachment), the operator can start up the engine in machine 10, and shut that engine off, through operator control inputs 250 on the attachment. The operator simply actuates the appropriate control input which provides a signal to attachment controller 240. Attachment controller 240, in turn, communicates that signal to machine controller 224 which starts or shuts off the engine of machine 10. In that instance, it may be desirable that machine 10 have a backup battery or other power supply to supply control system 220 with electrical power. Control system 222 can also provide power to control system 220. When the operator desires to use the attachment when the engine or machine 10 has been shut off, the operator actuates one of operator control inputs 250 indicating that the operator would like to restart the engine on machine 10. This causes attachment controller 240 to communicate with machine controller 224, causing machine controller 224 to restart the engine on machine 10, thus providing machine 10 with the ability to provide power to the attachment power actuators 244 on the attachment coupled thereto.

In addition, the present invention can be used to eliminate or reduce the need for relief valves on the attachment. For example, attachment controller 240 can be configured to monitor flow sensors, or pressure sensors, residing in attachment power circuit 242. Attachment controller 240 can also be configured to, upon power up, retrieve a pressure or flow range from memory 246. This provides the pressure or flow range (or both) for the particular attachment on which attachment controller 240 is mounted. During operation, attachment controller 240 periodically monitors the pressure or flow sensed by the sensors and ensures that it remains within the desired range (or, for example, below the desired high limit).

If the pressure or flow goes out of range, attachment controller 240 either diverts hydraulic fluid flow around attachment power actuator 244, or causes the hydraulic fluid flow to cease. In diverting the hydraulic fluid flow, attachment controller 240 actuates a diverter valve in attachment power circuit 242 which diverts the flow either to tank, or at least around the attachment power actuator 244. In discontinuing the hydraulic fluid flow, attachment controller 240 communicates with machine controller 224 and requests that machine controller 224 control machine power circuit 230 to stop providing hydraulic fluid under pressure to the attachment. This can either be done by simply shutting off hydraulic fluid flow, or diverting it to tank or at least routing it around the attachment, rather than providing it to the attachment.

It should also be noted that in the embodiment in which flow for machine 10 is controlled to be within a given range for a desired attachment, the specific operator actuator which sets the flow can still move to full range. For example, where machine power circuit 230 is capable of providing 18 gallons of hydraulic fluid flow, but where the attachment is hand held auger 200 shown in FIG. 5, hydraulic motor 202 and auger 200 may only be capable of accommodating a maximum of three gallons of hydraulic fluid flow. In the preferred embodiment, the flow to motor 202 increases from zero to three gallons depending upon the degree of compression of hand grip actuator 210. Where hand grip actuator 210 is not depressed at all, no hydraulic fluid flows. Where hand grip actuator 210 is fully depressed, three gallons of flow is provided. The flow is continuously increased between zero and three gallons as the hand grip actuator 210 is moved from the undepressed to the fully depressed position, even though the flow from machine 10 has been reduced from an 18 gallon maximum to a three gallon maximum.

This is preferably accomplished by either attachment controller 240 or machine controller 224, whichever controls flow to the attachment. In the instance where machine controller 224 controls the flow from zero to three gallons, it does so based on an initial identification of the specific attachment being operated. Then, as the operator depresses hand grip actuator 210 (which is represented in FIG. 6 by operator control input 250), attachment controller 240 continuously communicates with machine controller 224 causing machine controller 224 to increase the hydraulic fluid flow provided by machine power circuit 230 from zero to three gallons. Where attachment controller 240 varies the flow, attachment controller 240 simply controls attachment power circuit 242 to increase flow from zero to three gallons as the operator continues to actuate the operator controller 250.

In accordance with another preferred embodiment of the present invention, the attachment also includes GPS receiver 256. In the preferred embodiment, GPS receiver 256 is any suitable and commercially available GPS receiver which receives position information from a Global Positioning System. The GPS receiver preferably periodically receives and records the position information and provides it to attachment controller 240. Attachment controller 240 preferably stores the number of sets of previous position information, as well as the present set of position information, in memory 246.

When attachment controller 240 receives a position request through wireless transceiver 258, attachment controller 240 retrieves the present and past stored position information data sets and transmits them to wireless transceiver 236, or another appropriate wireless transceiver. Thus, the position of the attachment, and machine 10 (if the attachment is still attached to machine 10) can be tracked at all times. In the preferred embodiment, the wireless transceiver 258 is a cellular transceiver when the GPS receiver 256 is provided. The attachment can alternatively be located using cellular triangulation, a LORAN locating system or another suitable locating system.

The attachment can have its own self contained power supply so that attachment controller 240, and the other electrical components on the attachment, can operate regardless of whether they are attached to machine 10. This particularly facilitates transmission of GPS information, for example, even when the attachment is no longer attached to machine 10.

Another feature of the present invention is preferably implemented because different attachments require different functionality. In other words, the tree spade attachment requires different functions to be performed than other attachments, such as a stump grinder. Thus, different functions are assigned to the different electronic controls 227 and in the operator compartment of machine 10. In one preferred embodiment, as soon as machine controller 224 identifies the specific type of attachment coupled to machine 10, machine controller 224 displays at operator interface 228 the specific attachment type. It also provides indicia to the operator in operator compartment 18 which indicates which specific electronic operator input control devices accomplish which functions on the attachment. For example, where the attachment is a tree spade, one of the operator actuable switches on one of the hand grips in the operator compartment may cause the gate of the tree spade to open and close. By contrast, if the attachment is a stump grinder, that same operator actuable switch may cause the stump grinder to move side-to-side. In the preferred embodiment, machine controller 224 displays this information on operator interface 228 upon power up of the machine, and once the specific type of attachment coupled thereto has been identified.

Figure 7:
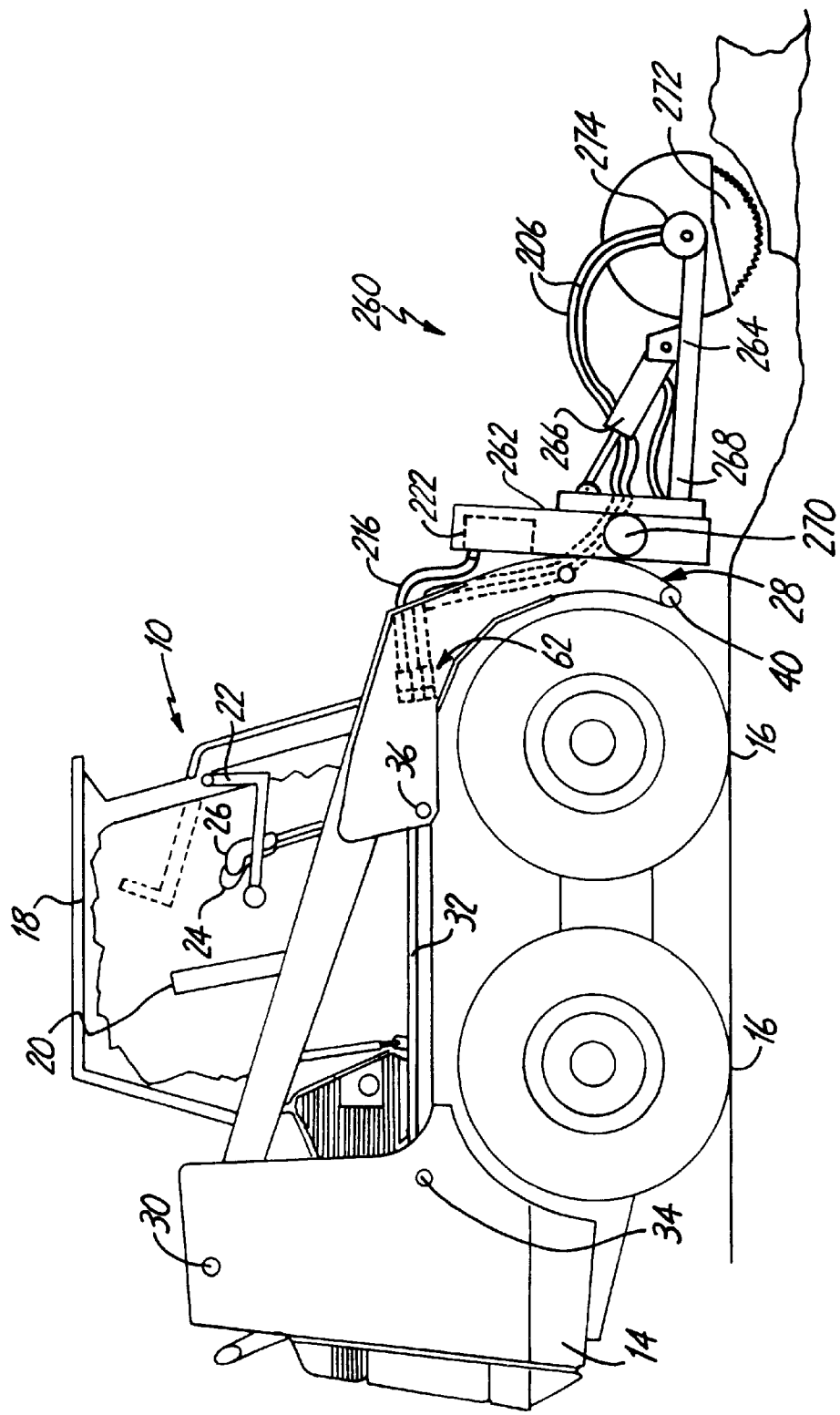
FIG. 7 is a side view of a skid steer loader with a stump grinder attachment.
Figure 8:
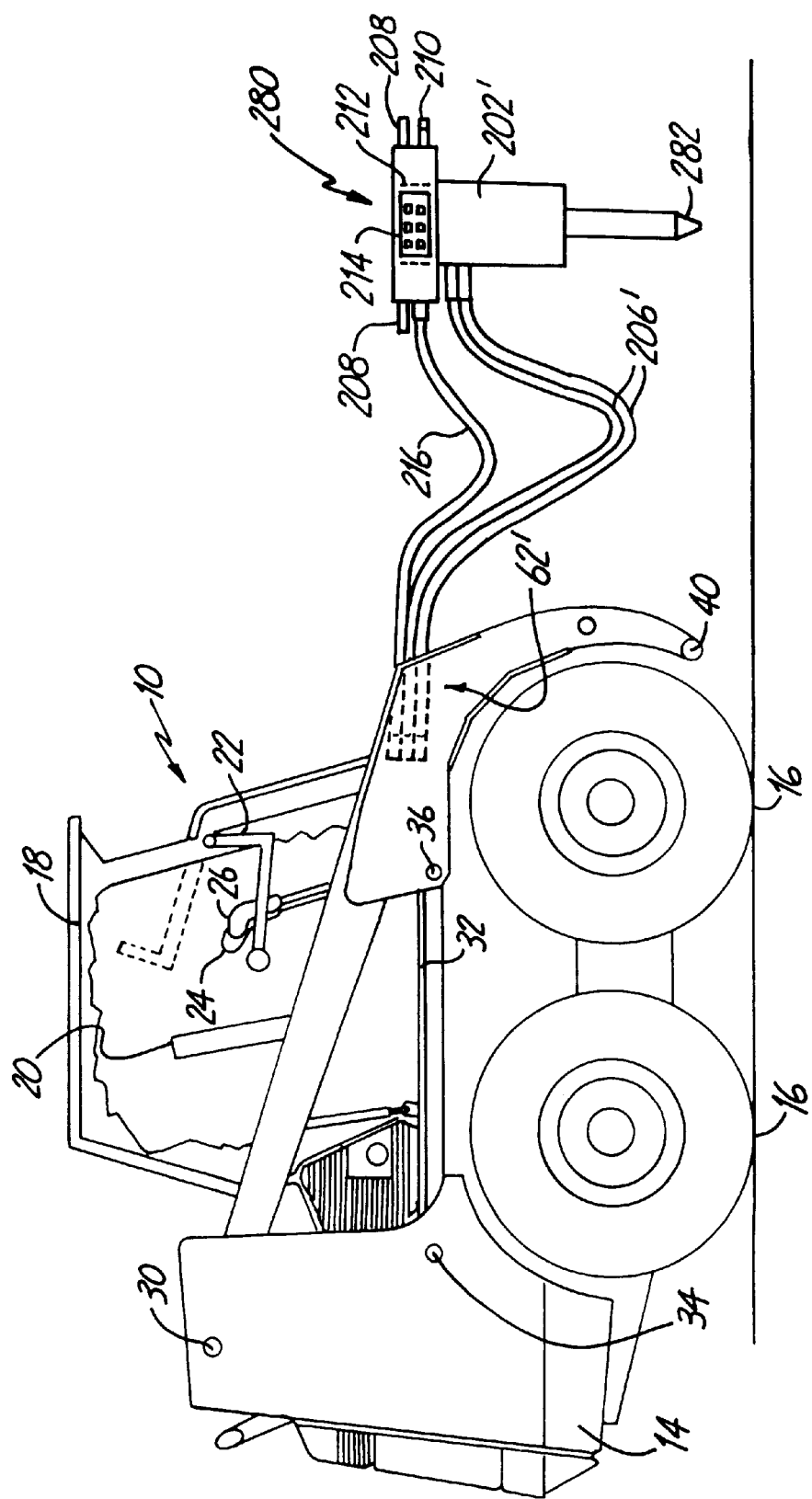
FIG. 8 is a side view of a skid steer loader with a hand-operated jack hammer attachment.
Figure 9:
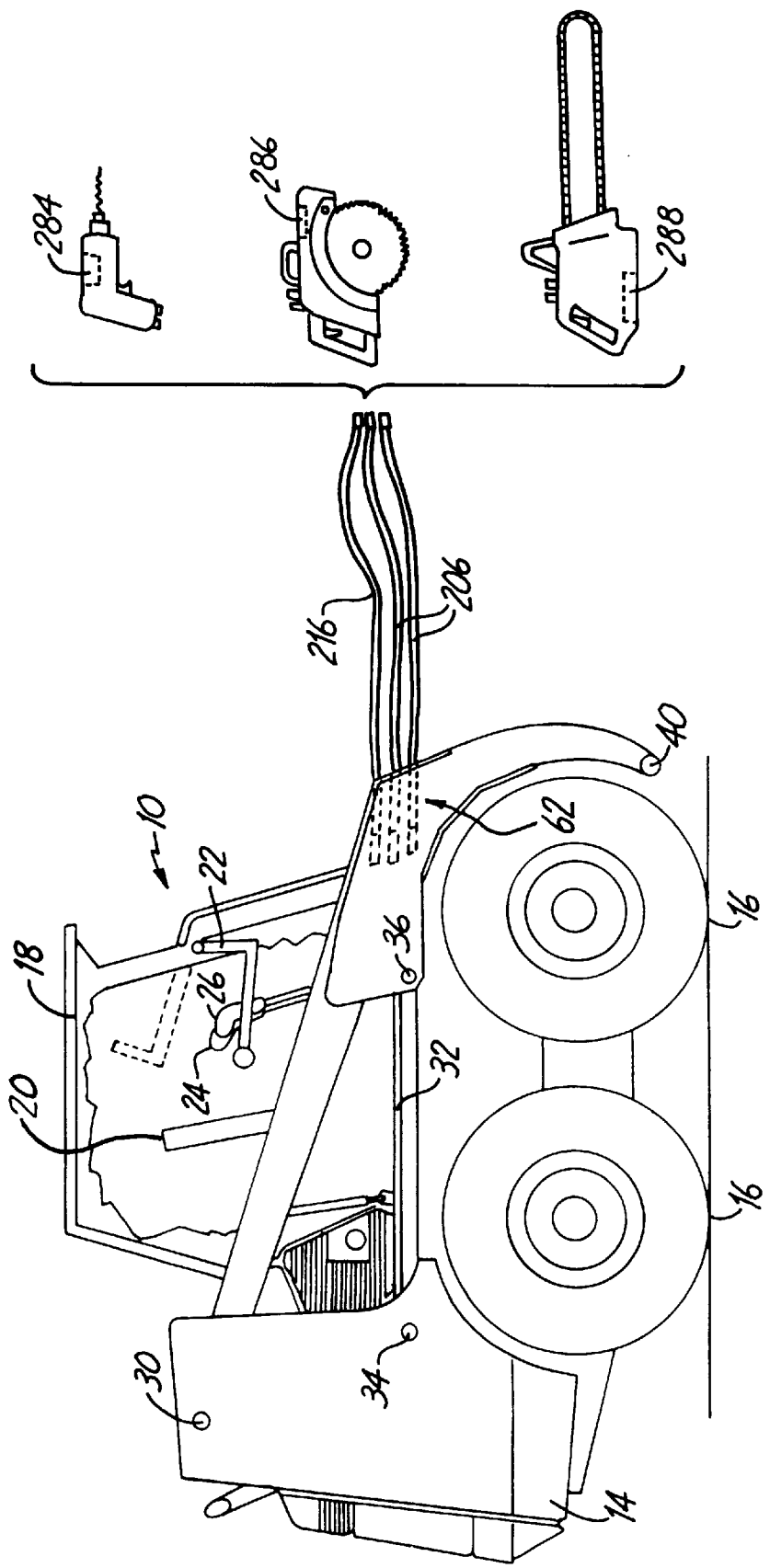
FIG. 9 is a side view of a skid steer loader illustrating the possible attachment of a hand held drill, a hand held circular saw or a hand held chain saw.

The remaining functionality of the system shown in FIG. 6 is described with respect to FIGS. 7–9.

FIG. 7 is a side view of skid steer loader (machine) 10 attached to stump grinder 260. Stump grinder 260 includes mounting bracket 262 which is mounted to lift arm 28. Stump grinder 260 also includes mounting plate 264 which is mounted to bracket 262. Plate 264 is pivotally mounted to bracket 262 and is pivoted through manipulation of hydraulic cylinder 266. When hydraulic cylinder 266 is contracted, it causes plate 264 to rotate upwardly. When cylinder 266 is lengthened, plate 264 pivots downwardly. This causes movement of the stump grinder in a generally vertically upward and downward direction, respectively. Stump grinder 260 also includes slidable plate 268 which is slidably mounted to bracket 262. Slidable plate 268 is mounted for a horizontal movement into and out of the page of FIG. 7. This movement is driven by hydraulic or electric motor 270 based on inputs by the operator and operating compartment 18.

Stump grinder 260 further includes grinding blade 272 which is driven by a hydraulic motor 274 and rotates generally about an axis defined by motor 274. Motor 274 is provided with hydraulic fluid pressure through hoses 206 which are coupled to hydraulic couplings 62.

Further, control system 222 is mounted to mounting bracket 262 and is provided with electrical power through harness 216.

In normal operation, the operator positions blade 272 of stump grinder 260 closely proximate the stump using machine 10. The operator then actuates an operator actuatable input on one of hand grips 24 or 26 which causes hydraulic fluid under pressure to be provided to motor 274 causing blade 272 to begin rotating. The operator then causes blade 272 to move laterally across the stump by actuating motor 270 so that plate 268 slides across bracket 262. As soon as stump grinder 260 has made one pass across the stump, the operator moves slightly forward with machine 10 and causes stump grinder 260 to make another pass across the stump. This is repeated until the stump grinder has passed completely across (and ground away) the upper surface of the stump. The operator then causes cylinder 266 to extend and then thereby lower blade 272. The operator then causes the stump grinder 260 to pass back and forth over the stump in the same manner as just described. These steps are repeated until a desired amount of the stump has been ground away.

Since operation of the stump grinder 260 requires substantial repetition, another feature according to the present invention can be efficiently implemented. Referring again to FIG. 6, control system 222 is preferably provided with position sensors 252. The position sensors 252 are mounted on stump grinder 260 such that they provide position signals indicative of the position of the blade 272 of stump grinder 260. Thus, as stump grinder 260 is moved back and forth for one complete pass over the stump, attachment controller 240 monitors the outputs from position sensors 252 and stores them in memory 246. In doing this an adequate number of times, attachment controller 240 essentially memorizes the position of stump grinder 260 during an entire pass over the stump. This way, the operator can simply actuate one operator actuable input switch and have attachment controller 240 control the various power actuators 244 and monitor position signals from position sensors 252 in stump grinder 260 to cause the stump grinder 260 to repeat the pass. Thus, all the operator need do is simply actuate the operator actuable input a desired number of times until adequate stump grinding has been performed.

Alternatively, attachment controller 240 and stump grinder 260 can be programmed to simply move through a predetermined size or volume range. In this way, the operator need only actuate one operator actuable input one time and stump grinder 260 will, itself, grind an entire stump which is within the predetermined or preprogrammed size range.

The same feature can be implemented for attachments which repetitively sequence through various speeds. In that instance, control system 222 is provided with speed sensor 254 which senses the speed of the desired power actuator on the attachment. For example, it may be desirable to begin grinding with stump grinder 260 at a high speed initially, but during the middle of the pass, have stump grinder 260 advance more slowly across the stump. Speed sensor 254 is thus preferably embodied as an encoder on the motor 270 which advances stump grinder 260 latterly over the stump. Again, under initial operator controlled actuation, attachment controller 240 monitors the signal provided by speed sensor 254 to determine the speed which stump grinder 260 is moving at various places during the pass of the stump grinder over the stump. Attachment controller 240 then causes motor 270 to repeat this speed during subsequent passes.

In another embodiment, where the attachment is implemented as a demolition sheer, for example, it is common that the demolition sheer desirably closes very slowly, but opens very quickly during sheering operations. Thus, using the memory feature of the present invention, and using appropriate speed and position sensors, the speed and the sheering steps are preferably repeated by the attachment itself, without requiring repeated operations by the operator. This feature can be implemented during substantially any operation which requires repetition or which follows a predetermined sequence of steps.

FIG. 8 is a side view of power machine 10 attached to a pneumatic hammer 280. Pneumatic hammer 280 is, in many respects, operated in similar fashion to hand held auger 200 shown in FIG. 5 and similar items are similarly numbered. However, instead of being provided with hydraulic fluid under pressure through conduits 206, pneumatic hammer 280 is provided with pneumatic pressure through conduits 206' which are coupled to connectors 62'. Also, instead of using a hydraulic motor 202 to drive the tool, pneumatic hammer includes a pneumatic motor 202' to drive bit 282.

FIG. 9 is a side view of power machine 10 and illustrates that it can be couplable to quite small hand held tools, such as drill 284, circular saw 286 or chain saw 288. In the embodiment in which tools 284, 286 and 288 are electrically powered, only one harness 216 is required. Alternatively, of course, additional harnesses can be provided to couple a plurality of tools to machine 10 at any given time. Further, the hand held tools can be pneumatically or hydraulically driven tools. In that case, conduits, such as hoses 206 or 206' are also provided to power the tools. In any case, each of the tools preferably includes a control system such as control system 222 which communicates desired signals back to machine controller 224 in machine 10 to accomplish desired operation.

It should also be noted that some skid steer loaders are provided with an interlock control system such as that set out in U.S. Pat. No. 5,425,431 issued on Jun. 20, 1995, to Brandt et al. Such systems provide certain interlocks which lock out certain functions based on inputs from various sensors. Therefore, additional inputs can be provided to controllers 82, 240 indicating the state of the outputs from such an interlock control system. Based on these inputs, controllers 82, 240 operate accordingly to shut off hydraulic flow to any desired actuators.

By providing a microprocessor on the attachment according to the present invention, the rear or front auxiliaries can be used for both the attachment and the rear stabilizers in a working situation. The attachment controllers 82, 240 provide signals to and communicate with the loader controllers to facilitate this function. Further, with the implementation of a microprocessor or other suitable controller on the attachment itself, numerous functions on the attachment can be controlled with minimum electrical signals being provided to the controller. This provides the ability to add additional control functions on the attachment without increasing the cost of the skid steer loader, by simply putting appropriate logic and control features into control circuits 68, 222. Also, by providing an electronic controller on the attachment, the controller of the attachment can be interfaced with, and connected to, any other microprocessors which are utilized in controlling the skid steer loader 10. Preferably, the controllers communicate using a serial communications protocol.

It should be noted that the above description has proceeded with respect to implementation of the present invention on a skid steer loader. However, it can also be implemented on other power machinery such as mini-excavators, stationary power units, etc.

Although the present invention has been described with reference to preferred embodiments, workers skilled in the art will recognize that changes may be made in form and detail without departing from the spirit and scope of the invention.

What is claimed is:

1. In combination, a power machine and attachment, the power machine comprising:

a power system providing power;

and wherein one of the power machine and attachment comprises:

an operator input device providing operator input signals based on operator inputs; and wherein the attachment comprises:

a tool;

an attachment power actuator removably connected to the power system and connected to the tool; and a first electronic controller mounted on the attachment and operably coupled to the operator input device, the first controller configured to control the attachment power actuator based on the operator input signals.

2. The combination of claim 1 wherein the power machine further comprises:

an identifier mounted on the power machine and operably couplable to the first controller and providing identification signals indicative of operational characteristics of the power machine.

3. The combination of claim 2 wherein the first controller controls operation of the power machine based on the identification signals.

4. The combination of claim 3 wherein the first controller controls the power system based on the identification signals.

5. The combination of claim 1 wherein the power system comprises:

a hydraulic system providing hydraulic fluid under pressure and wherein the first controller controls flow of the hydraulic fluid under pressure to the attachment power actuator.

6. The combination of claim 5 wherein the operator input device is mounted on the attachment.

7. The combination of claim 6 wherein the tool comprises:

a hand held too.

8. The combination of claim 7 wherein the operator input device comprises:

a first operator actuable input coupled to the first controller; and a second operator actuable input coupled to at least one of the first controller and the attachment power actuator;

wherein the attachment power actuator only provides power to the tool upon actuation of both the first and second operator actuable inputs.

9. The combination of claim 8 wherein the first operator actuable input comprises:

a code input device providing the first controller with code signals based on operator actuation of the code input device, the first controller controlling the attachment power actuator based on the code signals.

10. The combination of claim 1 wherein the first controller is configured to detect an operating state of the attachment and to control the power system based on the operating state.

11. The combination of claim 10 wherein the first controller detects the operating state based on the operator input signals.

12. The combination of claim 10 wherein the operating state detected by the first controller is indicative of whether the attachment power actuator is activated.

13. The combination of claim 12 wherein the first controller is configured to control the power system to adjust available power supplied by the power system based on the operating state detected.

14. The combination of claim 13 wherein the power system includes a hydraulic pump providing hydraulic fluid under pressure and a motor coupled to the hydraulic pump and wherein the first controller controls a speed of operation of the motor based on the operating state detected.

15. The combination of claim 1 wherein the power system comprises a hydraulic system providing hydraulic fluid under pressure and wherein the attachment further comprises:

at least one sensor coupled to the first controller and configured to sense a characteristic of the hydraulic fluid and provide a sensor output signal indicative of the characteristic sensed.

16. The combination of claim 15 wherein the characteristic sensed comprises pressure and wherein the first controller is configured to control pressure of the hydraulic fluid provided to the attachment based on the sensed pressure.

17. The combination of claim 16 wherein the controller is configured to determine whether the pressure detected is within an acceptable range and to control shutting off of flow to the attachment or redirecting flow from the attachment based on the determination.

18. The combination of claim 17 wherein the acceptable range is based on an identification of the attachment.

19. The combination of claim 15 wherein the power system includes a power system controller controlling the power system and wherein the first controller is operably coupled to the power system controller and provides signals to the power system controller to control the power system based on the sensor output signal.

20. The combination of claim 19 wherein the sensor comprises a flow sensor and wherein the first controller is configured to determine whether flow is in an acceptable range and to control the power system controller based on the determination.

21. The combination of claim 20 wherein the acceptable range is based on an identification of the attachment.

22. The combination of claim 1 wherein the power machine further comprises:
   a machine power actuator for performing power machine operations; and
   a second electronic controller coupled to the power actuator and configured to control the machine power actuator, and wherein the first and second controllers are operably coupled to one another for communication with one another.

23. The combination of claim 22 wherein the first controller provides input signals to the second controller to control the second controller.

24. The combination of claim 22 wherein the second controller provides input signals to the first controller to control the first controller.

25. The combination of claim 22 wherein the first and second controllers are coupled for serial communication with one another.

26. The combination of claim 22 wherein the first and second controllers are coupled to one another using a wireless coupling.

27. The combination of claim 22 wherein the power machine further comprises:
   at least one machine sensor coupled to the second controller and sensing a status condition in the power machine and providing a machine sensor output signal based on the status condition sensed, wherein the second controller is configured to control the machine power actuator based on the machine sensor output signal.

28. The combination of claim 27 wherein the second controller disables predetermined operations of the machine power actuator based on communications from the first controller.

29. The combination of claim 28 wherein the operator input device is provided on the attachment and wherein the first controller is configured to communicate with the second controller to cause the second controller to control the machine power actuator based on operator input signals from the operator input device.

30. The combination of claim 29 wherein the operator input signals are indicative of an attachment operating mode.

31. The combination of claim 28 wherein the attachment includes at least one attachment sensor coupled to the second controller, sensing a status condition of the attachment and providing an attachment sensor signal based on the status condition sensed, wherein the first controller controls the attachment power actuator based on the attachment sensor signal.

32. The combination of claim 31 wherein the first controller provides communication signals to the second controller based on the attachment sensor signal and wherein the second controller controls the machine power actuator based on the communication signals.

33. The combination of claim 27 wherein the at least one machine sensor comprises:
   at least one of an operator presence sensor and a seat bar position sensor.

34. The combination of claim 22 wherein the machine power actuator comprises:
   at least one of a traction motor coupled to a drive mechanism and a hydraulic motor.

35. The combination of claim 1 wherein the tool is configured to perform repeated operations, and the attachment further comprises:
   a first sensor coupled to the first controller, providing a first sensor signal indicative of a first characteristic of a first of the repeated operations, the first controller storing first data indicative of the first characteristic and controlling the tool to perform at least one subsequent operation of the repeated operations based on the first data.

36. The combination of claim 35 wherein the tool repeatedly moves to various positions in performing the repeated operations and wherein the first sensor comprises a position sensor providing the first sensor signal indicative of tool position.

37. The combination of claim 35 and further comprising:
   a second sensor, coupled to the first controller, providing a second sensor signal indicative of a second characteristic of the first of the repeated operations, the first controller storing second data indicative of the second characteristic and controlling the tool to perform the subsequent operation based on the second data.

38. The combination of claim 37 wherein the second sensor comprises:
   a hydraulic fluid sensor sensing a characteristic of hydraulic fluid flow to the attachment.

39. The combination of claim 38 wherein the characteristic of hydraulic fluid flow comprises at least one of fluid flow rate and fluid pressure.

40. The combination of claim 37 wherein the second sensor comprises:
   a speed sensor sensing a speed of operation of the tool.

41. The combination of claim 37 wherein the attachment comprises:
   a stump grinder wherein the first data is indicative of the position of the stump grinder to be obtained during repeated passes of the stump grinder.

42. The combination of claim 41 wherein the second data is indicative of rotational speed of the stump grinder at a plurality of points along the repeated passes.

43. The combination of claim 1 wherein the first controller includes a geographic positioning system providing signals indicative of a geographic location of the attachment.

44. The combination of claim 1 wherein the power machine includes a geographic positioning system providing signals indicative of a geographic location of the power machine.

45. An attachment suitable for connection to a power machine of the type having a power circuit for powering the attachment, the attachment comprising:
   a tool;
   a power actuator removably connectable to the power circuit and connected to the tool;
   an operator input device receiving operator inputs and providing operator input signals based on the operator inputs; and
   a first electronic controller coupled to the operator input device and configured to control the power actuator and the power received from the power circuit based on the operator input signals.

46. An attachment suitable for connection to a power machine as in claim 45, wherein the power machine includes a second electronic controller coupled to a power machine actuator and configured to control the power machine actuator, and wherein the first and second controllers are operably coupled to one another for communication with one another.

47. In combination, a power machine and attachment, comprising:

a power system mounted to the power machine or providing power;

an operator input device mounted to one of the power machine and attachment for providing operator input signals based on operator inputs;

a tool mounted to the attachment;

an attachment power actuator connected between the tool and the attachment;

a first electronic controller mounted on the attachment and operably coupled to the operator input device, the first controller configured to control the attachment power actuator based on the operator input signals; and a second electronic controller mounted on the power machine and coupled to a power machine actuator and configured to control the power machine actuator, and wherein the first and second controllers are operably coupled to one another such that the first controller may control the second controller.

48. In combination, a power machine and attachment, the power machine comprising:

a power system providing power;

and wherein one of the power machine and attachment comprises:

an operator input device providing operator input signals based on operator inputs; and wherein the attachment comprises:

a tool;

an attachment power actuator removably connected to the power system and connected to the tool; and a means for controlling the attachment power actuator based on the operator input signals mounted on the attachment and operably coupled to the operator input device.

* * * * *

UNITED STATES PATENT AND TRADEMARK OFFICE
CERTIFICATE OF CORRECTION

PATENT NO. : 5,957,213
DATED : September 28, 1999
INVENTOR(S) : Orlan J. Loraas et al.

It is certified that error appears in the above-identified patent and that said Letters Patent is hereby corrected as shown below:

Claim 47 - Column 21, line 1, delete "or" insert --for--.

Signed and Sealed this

Ninth Day of May, 2000

Attest:

Q. TODD DICKINSON

*Attesting Officer*          *Director of Patents and Trademarks*